United States Patent
Huang

(10) Patent No.: US 7,824,040 B2
(45) Date of Patent: Nov. 2, 2010

(54) PROJECTOR AND LIGHT SOURCE ASSEMBLY EMPLOYED IN SAME

(75) Inventor: Kai Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 404 days.

(21) Appl. No.: 11/964,781

(22) Filed: Dec. 27, 2007

(65) Prior Publication Data

US 2009/0102388 A1    Apr. 23, 2009

(30) Foreign Application Priority Data

Oct. 17, 2007    (CN) .......................... 2007 1 0202104

(51) Int. Cl.
  *G03B 21/20* (2006.01)
  *G03B 21/00* (2006.01)
(52) U.S. Cl. .......................... 353/85; 353/122
(58) Field of Classification Search .................. 353/31, 353/94, 98, 99, 85, 122; 250/214 LS, 214 SW, 250/214.1, 214 R; 362/26, 238, 293; 349/5–9; 348/742, 743, 771
See application file for complete search history.

(56) References Cited

U.S. PATENT DOCUMENTS

| | | | |
|---|---|---|---|
| 3,667,754 A * | 6/1972 | Coole | ................ 472/61 |
| 5,073,023 A * | 12/1991 | Arsem | .......................... 353/42 |
| 6,467,910 B1 | 10/2002 | Sato | |
| 7,261,459 B2 | 8/2007 | Saegusa | |
| 2007/0165409 A1 * | 7/2007 | Shimaoka et al. | ............ 362/299 |

FOREIGN PATENT DOCUMENTS

| | | |
|---|---|---|
| CN | 1645710 A | 7/2005 |
| JP | 8136881 A | 5/1996 |

* cited by examiner

*Primary Examiner*—Georgia Y Epps
*Assistant Examiner*—Don Williams
(74) *Attorney, Agent, or Firm*—Jeffrey T. Knapp

(57) ABSTRACT

A light source assembly employed in a projector includes a light source, a power device, a light energy storage device, and a selection switch. The light source is configured for providing light beams for the projector. The selection switch is electrically connected to the light source, the light energy storage device and the power device and is configured for selecting one of the light energy storage device and the power device to provide power for the light source. The light energy storage device can absorb heat from the light source and convert the heat into electricity. Therefore, energy is saved and heat produced by the light source is reduced via the light energy storage device compared to the conventional light source assembly.

10 Claims, 3 Drawing Sheets

PROJECTOR AND LIGHT SOURCE ASSEMBLY EMPLOYED IN SAME

RELATED FIELD

The present invention relates generally to projectors, and more specifically to a projector and a light source assembly for the projector.

BACKGROUND

Generally, a light source assembly employed in a projector includes a light source and a power device electrically connected to the light source. The light source is configured for providing light for the projector. The power device is configured for providing power for the light source. The light source generally includes a lamp and a reflector disposed around the lamp. The reflector is configured for reflecting light output from the lamp in such a way so as to be irradiated as parallel beams. However, some of the light output from the light source will be absorbed by parts of the light source assembly producing heat. This necessitates a separate cooling device to increase the heat-dissipating efficiency in the projector.

It is desired to provide a light source assembly which can overcome the above-described deficiencies.

SUMMARY

In accordance with an exemplary embodiment, a light source assembly for a projector includes a light source, a power supply device, a light energy storage device, and a selection switch. The light source is configured to emit parallel light beams for the projector. The power supply device is electrically connected to the light source and configured for providing power for the light source. The light energy storage device is disposed outside of the light source and is configured for receiving light emitted from the light source and converting that light energy into storable electric power. The selection switch is electrically connected to the light source, the light energy storage device and the power device and is configured for selecting one of the light energy storage device and the power device to provide power for the light source.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof and with reference to the accompanying drawings, in which.

DETAILED DESCRIPTION OF THE PREFERRED EMBODIMENTS

A detailed explanation of a projector and a light source assembly employed in the projector according to an embodiment of the present invention will now be made with reference to the drawings attached hereto.

Figure 1:
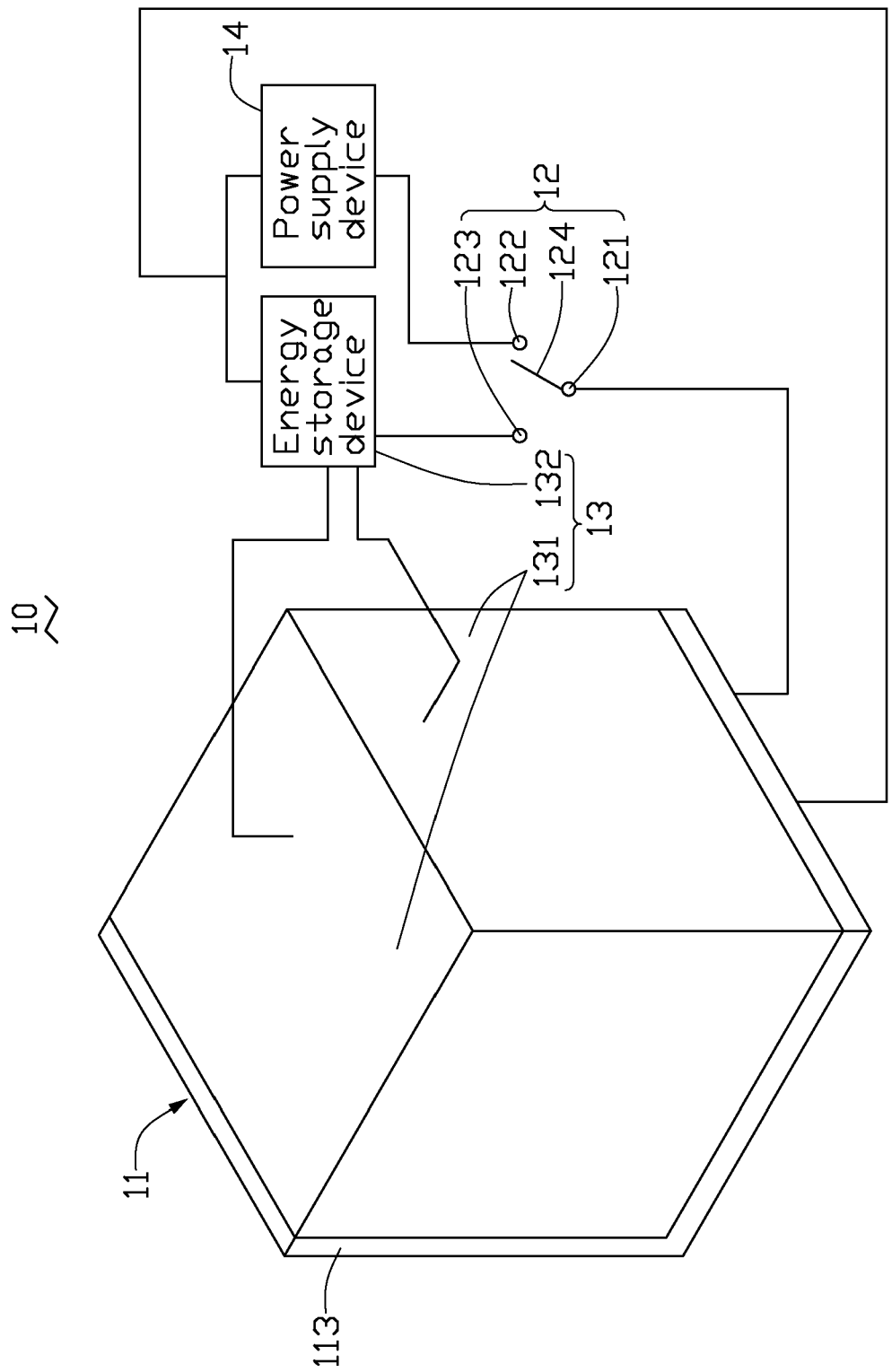
FIG. 1 is an isometric view of a configuration of a light source assembly and a circuit diagram of the light source assembly in accordance with the present invention.
Figure 2:
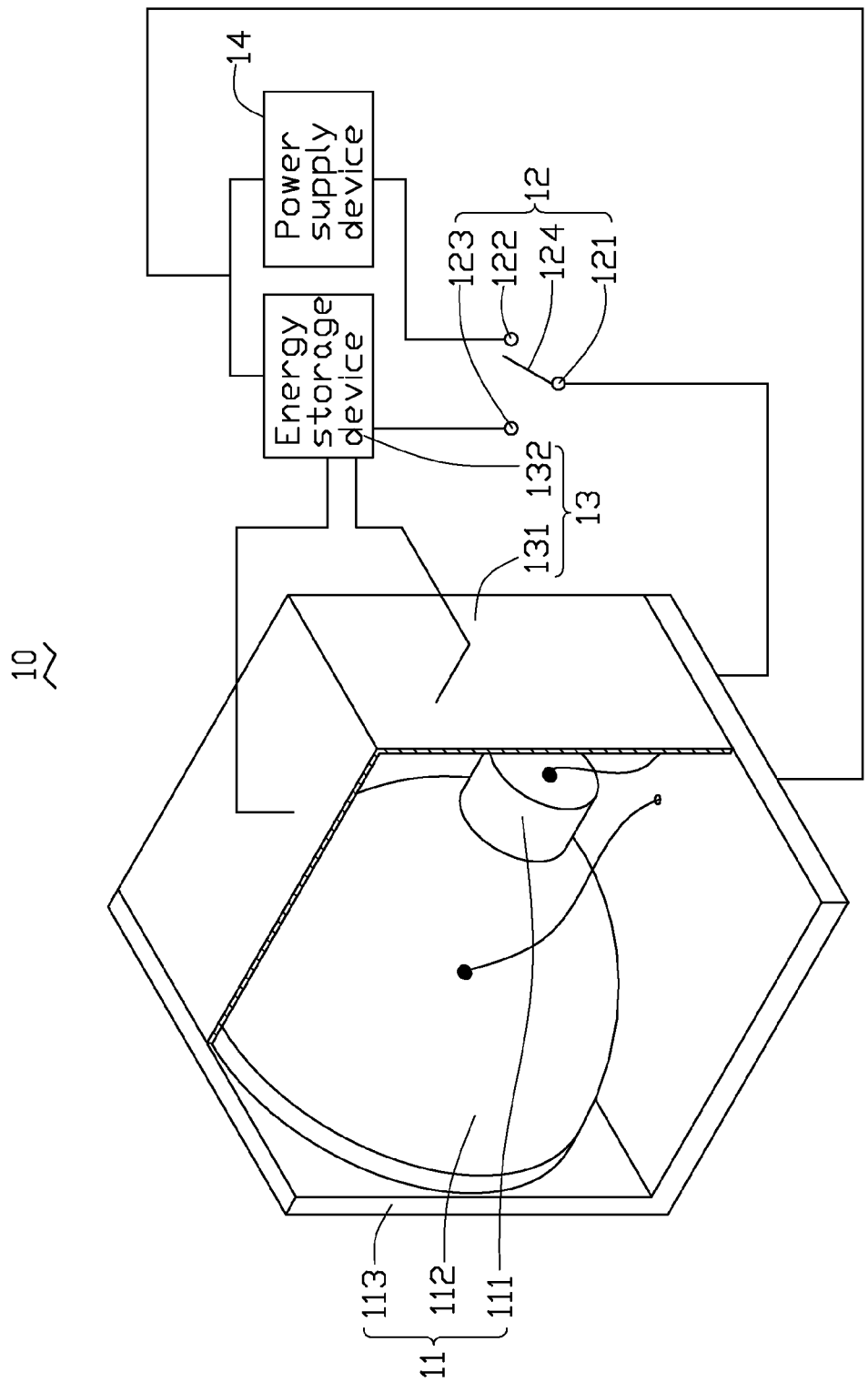
FIG. 2 is a partially cross-sectional view of the light source assembly of FIG. 1.

Referring to FIG. 1 and FIG. 2, a light source assembly 10 according to the present invention is shown. The light source assembly 10 includes a light source 11, a light energy storage device 13 disposed on an outside of the light source 11, a power supply device 14 electrically connected to the light source 11, and a selection switch 12.

The light source 11 includes a lamp 111, an ellipsoidal reflector 112, and a base 113. The lamp 111 is disposed in a space surrounded by the ellipsoidal reflector 112. The lamp 111 together with the reflector 112 is configured for providing parallel light beams for a projector. The lamp 111 can be a halogen lamp, a metal halogen lamp, a light emitting diode (LED), and the like. In the present embodiment, the lamp 111 is a halogen lamp that emits a white light. A reflective film (not shown) is employed on an inner surface of the ellipsoidal reflector 112 to reflect the light beams output from the light source. The base 113 is configured for fixing the lamp 111 and the reflector 112 to the projector via the base 113.

The selection switch 12 can be a multi-channel selective switch or a single-pole multi-throw switch. The selection switch 12 includes an output end 121, two input ends 122, 123, and a pole 124. The pole 124 is electrically connected to the output end 121. The lamp 111 is electrically connected to the output end 121. The two input ends 122, 123 are respectively connected to the light energy storage device 13 and the power device 14. Thus, the selection switch 12 can select one from the light energy storage device 13 and the power device 14 to provide energy for the lamp 111.

The light energy storage device 13 is configured for converting heat produced by light energy emitted from the light source assembly 11 into electricity. The light energy storage device 13 can be a solar cell or includes at lease a solar cell plate and a storage device. In the present embodiment, the light energy storage devices 13 includes three solar cell plates 131 and an energy storage device 132 electrically connected to the solar cell plates 131. The three solar cell plates 131 are respectively disposed outside of the light source 11 and fixed to the base 113. The solar cell plates 131 are configured for receiving the light emitted from the light source 11 and converting the light energy into electric power. The energy storage device 132 can be a battery configured for storing the electric power produced by the solar cell plates 131. The storage device 132 is electrically connected to the input end 123.

The power supply device 14 is configured for providing power to the lamp 111 when the light energy storage device 13 does not provide power to the lamp 111. The power supply device 14 is electrically connected to the input end 123. When the pole 124 contacts the input end 123, the power supply device 14 provides power to the lamp 111. When the pole 124 contacts the input end 122, the light energy storage device 13 provides power for the lamp 111.

Figure 3:
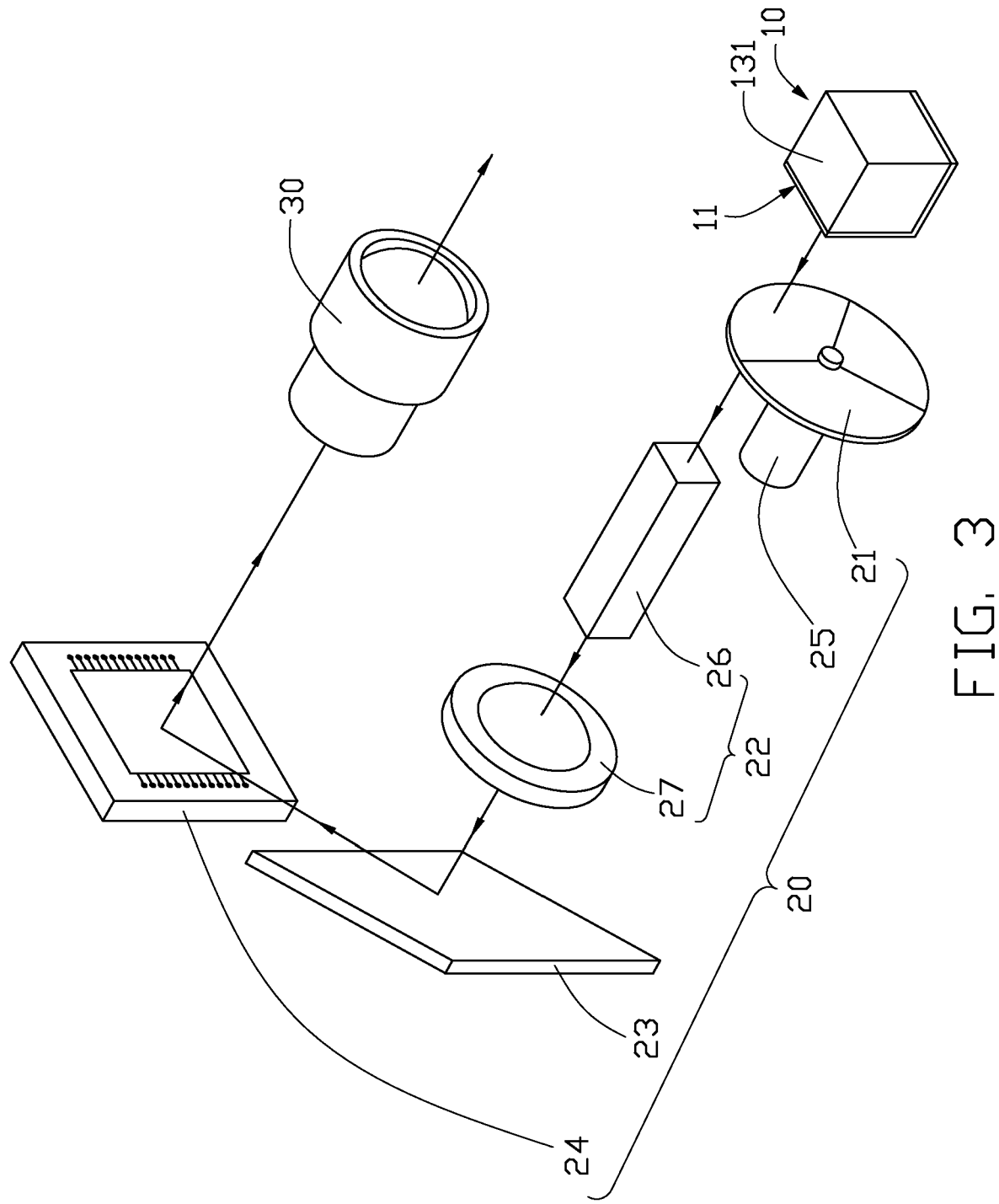
FIG. 3 is an isometric view of a projector in accordance with the present invention.

Referring to FIG. 3, the light source assembly 10 used in a digital light processing (DLP) projector according to the present invention is shown. It should be noted that the light source assembly 10 can also be used in other kinds of projectors, for example a liquid crystal display (LCD) projector or a liquid crystal on silicon (LCoS) projector. In the present embodiment, the DLP projector is presented only as an example to explain working principles of the light source assembly 10. The DLP projector includes the light source assembly 10, an image engine 20 positioned to receive the light output from the light source assembly 10, and a projecting lens 30 positioned to receive the light output from the image engine 30.

In FIG. 3, only the light source 11 and the solar cell plate 131 of the light source assembly 10 is shown. The light source assembly 10 provides white light for the DLP projector.

The image engine 20 includes a color wheel 21, a converging assembly 22, a reflective apparatus 23, and a digital micro-mirror device (DMD) 24. The color wheel 21 is configured for splitting the emergent light from the light source assembly 10 into time-sequenced red, green, and blue light beams. The color wheel 21 includes red, green, and blue color filters, and the center of the color wheel 21 is connected to a motor 25 such that the color wheel 21 can be rotated. The converging assembly 22 is positioned to receive the light output from the color wheel 21 and includes an integrator 26 and a condenser 27. The integrator 26 is configured for processing the light beam emitted from the color wheel 21 such that light beams exiting the integrator 26 have a uniform spatial distribution. The condenser 27 is a condensing lens and configured for avoiding dissipation of the light. The reflective apparatus 23 can be a mirror for changing light path of light output the condenser 27 to reduce the size of the projector. The DMD 24 is positioned to receive the light output from the reflecting apparatus 23 and configured for superimposing spatial information on the light and emits a light having image information.

The projecting lens 30 is configured for receiving the light output of the DMD 24, and magnifying the light output and projecting an image on a screen (not shown).

The light energy storage device can absorb light energy from the light source and convert the light energy into electric power. When the power supply device does not provide power to the lamp, the light energy storage device can supply power to the lamp. Therefore, energy is saved and heat produced by the light source is reduced via the light energy storage device compared to the conventional light source assembly.

It should be understood that the above-described embodiment are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A light source assembly for a projector, comprising:
   a light source configured for providing light beams;
   a power supply device electrically connected to the light source and configured for providing power to the light source;
   a light energy storage device disposed outside the light source and configured for receiving the light emitted from the light source and converting the light energy into electric power, the light energy storage device comprising at least one solar cell plate, and an energy storage device electrically connected to the solar cell plate and configured for storing electric power produced by the solar cell plate; and
   a selection switch electrically connected to the light source, the light energy storage device and the power device and configured for selecting one of the light energy storage device and the power supply device to provide power for the light source.

2. The light source assembly as claimed in claim 1, wherein the light source comprises a lamp and an ellipsoidal reflector, the lamp being surrounded by the ellipsoidal reflector.

3. The light source assembly as claimed in claim 2, wherein the light source further comprises a base configured for fixing the lamp and the reflector to the projector, the at least one solar cell plate is fixed to the base.

4. The light source assembly as claimed in claim 2, wherein the selection switch comprises an output end and two input ends, the lamp is electrically connected to the output end, the power supply device is electrically connected to one of the input ends, the light energy storage device is electrically connected to the other input end, the power supply device is configured for providing power to the lamp when the light energy storage device does not provide power to the lamp.

5. The light source assembly as claimed in claim 1, wherein the light energy storage device comprises a solar cell.

6. The light source assembly as claimed in claim 1, wherein the energy storage device is a battery.

7. The light source assembly as claimed in claim 1, wherein the selection switch is a multi-channel selective switch.

8. The light source assembly as claimed in claim 1, wherein the selection switch is a single-pole multi-throw switch.

9. A projector comprising
   a light source assembly comprising
      a light source,
      a power supply device,
      a light energy storage device for receiving the light emitted from the light source and converting light energy into electric power, the light energy storage device comprising at least one solar cell plate, and an energy storage device electrically connected to the solar cell plate and configured for storing electric power produced by the solar cell plate, and
      a selection switch electrically connected to the light source, the light energy storage device and the power supply device, and configured for selecting one of the light energy storage device and the power supply device to provide power to the light source,
   an image engine positioned to receive the light beams from the light source assembly and configured for superimposing spatial information on the light beams, and a projecting lens positioned to receive the light output from the image engine.

10. The projector as claimed in claim 9, wherein the image engine comprises a color wheel positioned to receive the light output from the light source assembly, a condenser positioned to receive the light output from the color wheel, an adjusting module positioned to receive the light output from the condenser, and a digital micro-mirror device positioned to receive the light output from the adjusting module.

* * * * *